Nov. 8, 1960 W. J. DUDA 2,959,436
TERMINAL AND SPLICING FITTINGS FOR WIRE ROPE AND THE LIKE
Filed Sept. 13, 1956 4 Sheets-Sheet 1
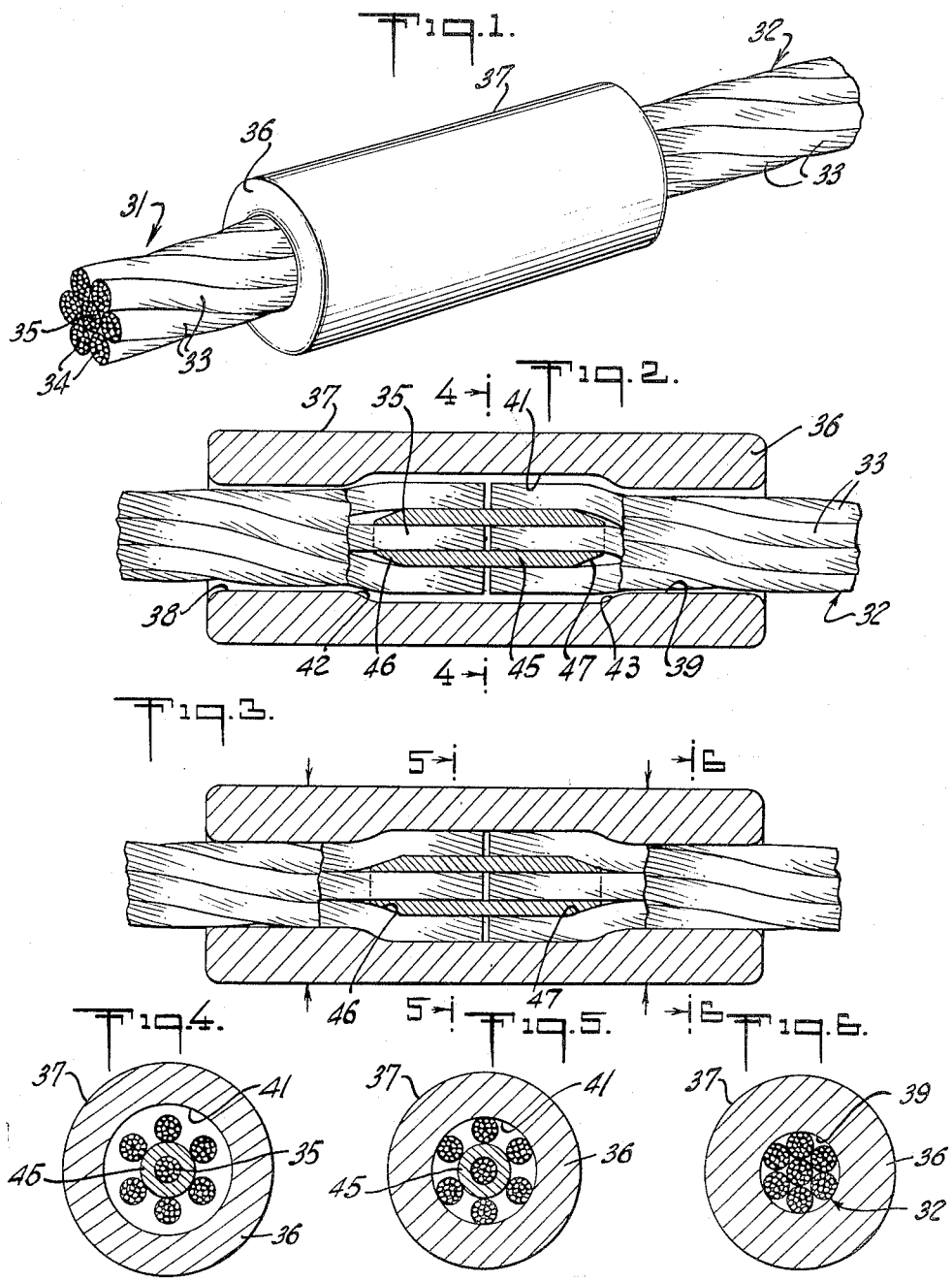
INVENTOR
WILLIAM J. DUDA
BY
J. Jordan Kunik
ATTORNEY Nov. 8, 1960  W. J. DUDA  2,959,436
TERMINAL AND SPLICING FITTINGS FOR WIRE ROPE AND THE LIKE
Filed Sept. 13, 1956  4 Sheets-Sheet 2
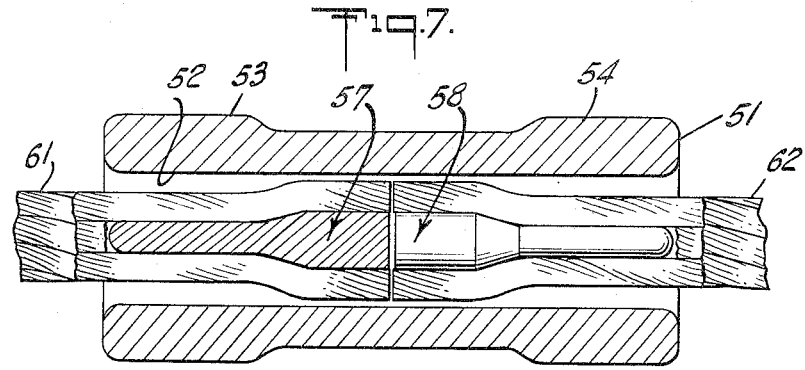
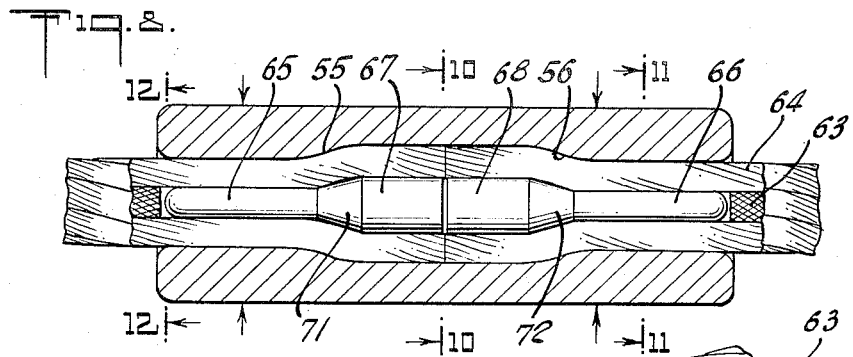
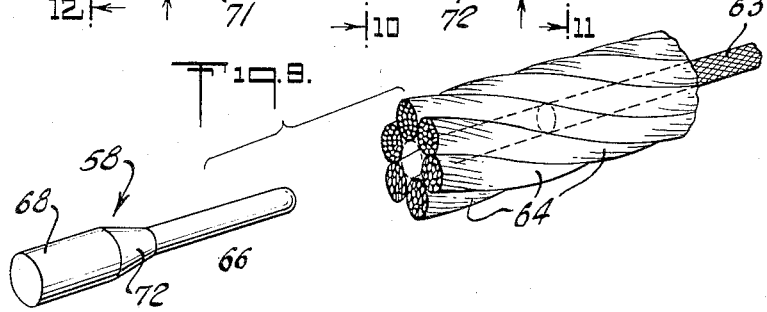
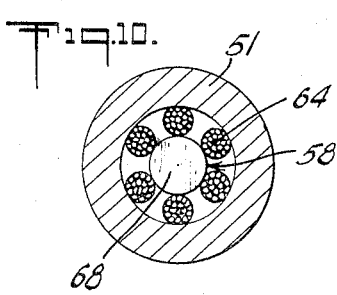
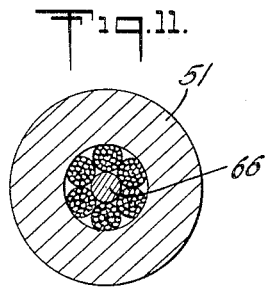
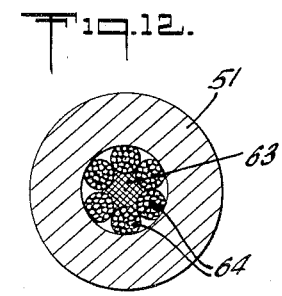
INVENTOR
WILLIAM J. DUDA
BY
L. Jordan Kunik
ATTORNEY

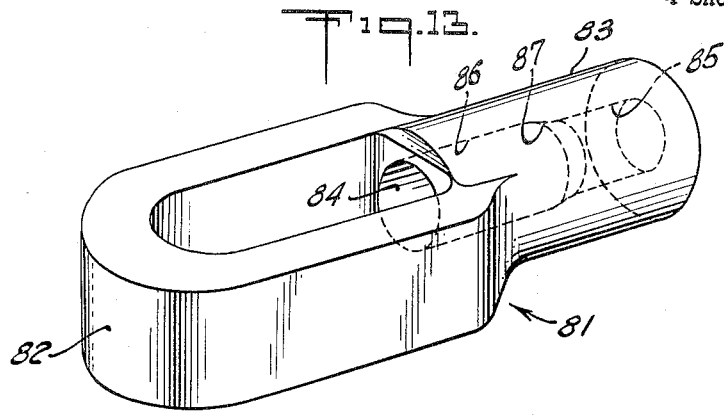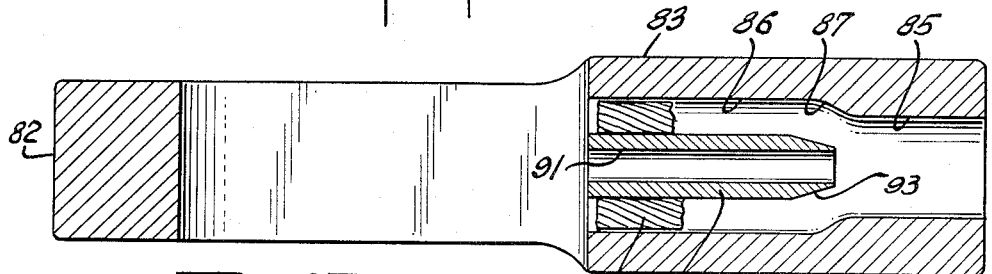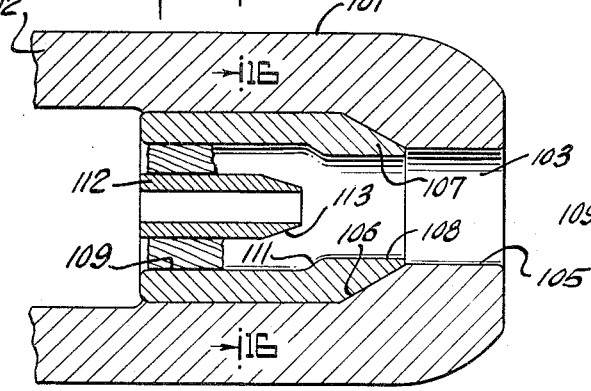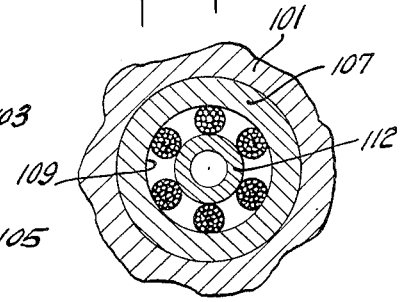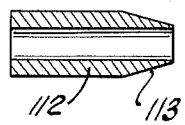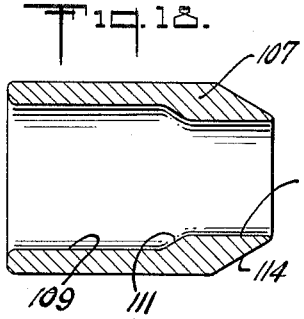
INVENTOR
WILLIAM J. DUDA
BY
I. Jordan Kunik
ATTORNEY

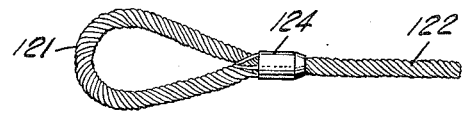
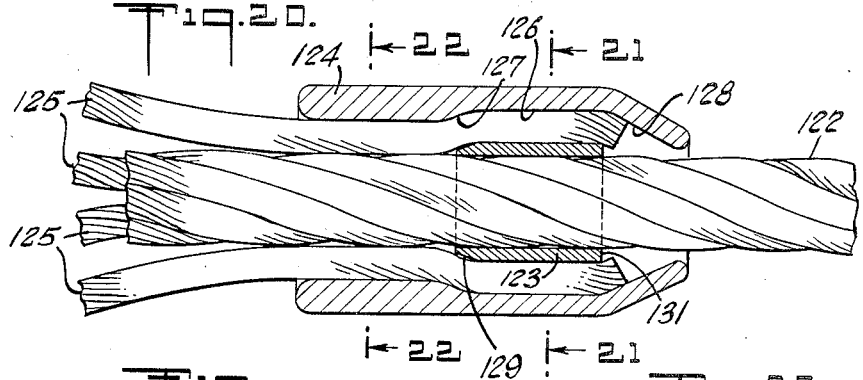
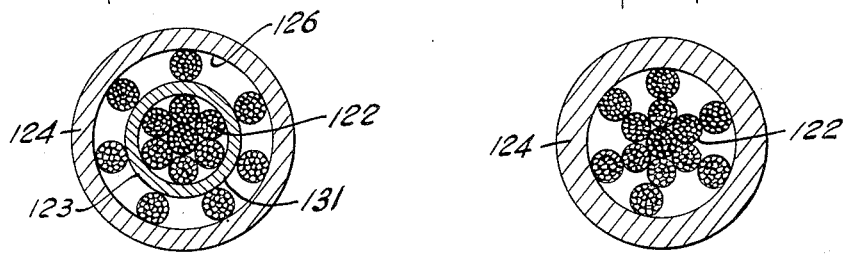
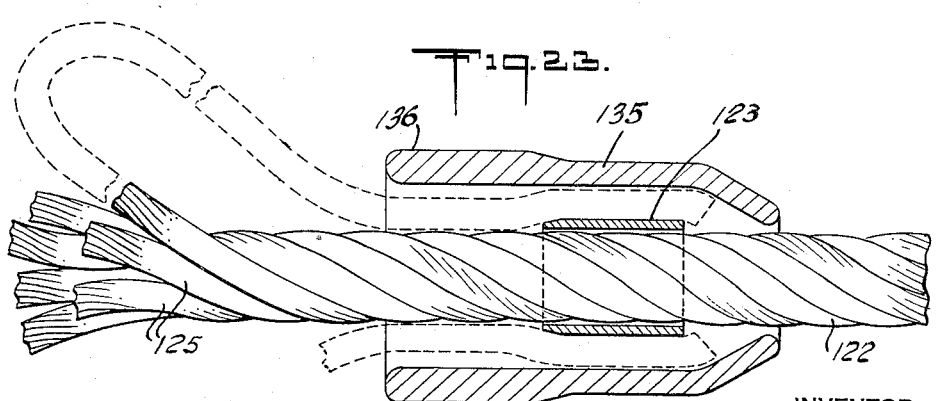

United States Patent Office 2,959,436
Patented Nov. 8, 1960

2,959,436

TERMINAL AND SPLICING FITTINGS FOR WIRE ROPE AND THE LIKE

William J. Duda, 19 Packard St., Bloomfield, Conn.

Filed Sept. 13, 1956, Ser. No. 609,575

6 Claims. (Cl. 287—75)

This invention relates to terminal fittings and splicing ferrules for rope and cable made of strands of wire, fabric or the like, and to methods for producing the same.

It has been the practice to provide terminal and splicing fittings for twisted wire rope in the form of substantially cylindrical ferrules which have been swaged around the peripheral surface of the wire rope. The wire rope is first inserted into a cylindrical ferrule whose substantially uniform internal diameter is somewhat larger than the external diameter of the rope, after which a swaging die is brought to bear on the external surface of the ferrule to reduce its internal diameter, and to cause the interior surfaces thereof frictionally to engage the external surfaces of the wire rope. Since the wire rope or cable is made up of a plurality of twisted strands of wire of small diameter, the frictional engagement between the interior surfaces of the ferrule and the exterior surfaces of some of the small diameter strands is only obtained upon discrete peripheral points or small areas. Thus, when continued longitudinal tension is applied to the wire rope against the surface frictional engagement by the ferrule, the lateral forces imposed upon the points of contact between the exterior protuberances of the cable and the interior of the ferrule often causes said points or areas of frictional engagement to relax, and consequently, the rope begins to slip out of position longitudinally from the ferrule which has a substantially uniform diameter from end to end. As soon as any slippage occurs and deforms the previous frictional engaging areas between the ferrule and the rope, then considerably less force is subsequently necessary to cause complete slippage between the cable and the ferrule, thereby destroying the usefulness of the ferrule or the fitting and permitting disastrous mishaps to occur.

Where conventional swaging is utilized, there is never any certainty as to whether a secure joint is achieved. Nor is there any means for satisfactorily ascertaining how powerful the holding strength is in the conventional swaging structure. The conventional swaging process will produce slight indenting of the internal periphery of the somewhat ductile ferrule, and because of the recognition of this fact, ferrules are made in comparatively long lengths in order to provide greater gripping areas over a longer section of the rope.

The disadvantage of the conventional swaging system is that once the rope under heavy working load starts slipping from the ferrule, the slippage cannot be stopped. The swaging action produces only a limited maximum pressure upon the external strand surface of the rope, after which the material of the ferrule merely flows lengthwise and produces no further gripping function, no matter how much greater the swaging pressure may be applied. Where working loads for a particular wire rope are prescribed as not exceeding one-eighth (⅛) to one-fifth (⅕) of its breaking strength, for example, this large margin for safety is often attributable to the limited holding power of the terminal or splicing ferrule and, as a result, the full efficiency of the wire rope is never properly realized.

It can be appreciated that where wire ropes are to be used for hauling and hoisting heavy objects and for serving as guy lines for ships, towers and suspension structures, it is necessary to provide sufficiently secure splicing and terminal ferrules therefor so that service failures cannot possibly occur. Since such failures do occur, and since the ferrules are quickly discarded when any slippage is discovered, involving a considerable replacement and operational expense in fitting and swaging new ferrules, I now provide a novel lock structure between the ferrule and wire rope which ensures against failures in service.

The present invention comprises a chambered ferrule of non-uniform diameter in combination with a bushing or plug that is positioned within the terminal area of the wire rope inserted into the ferrule. The swaging of the chambered ferrule produces a locking action upon the wire rope in the area between a curved interior surface of the ferrule and the interior bushing or plug positioned substantially coaxially therein. The locking structure herein imposes pressures upon the rope in a resultant of forces which effectively oppose the longitudinal tension imposed upon the rope when hauling, hoisting and supporting heavy materials and structures. The lock structure of the present invention is complemented by the additional surface gripping action taking place between the outer periphery of the wire rope and the remaining interior surfaces of the ferrule when the latter is swaged over the rope, thereby resulting in a virtually fail-proof fitting.

Still other objects and advantages of my invention will be apparent from the specification.

The features of novelty which I believe to be characteristic of my invention are set forth herein and will best be understood, both as to their fundamental principles and as to their particular embodiments, by reference to the specification and accompanying drawings, in which:

Figure 1 is a perspective view of portions of a pair of wire ropes spliced by a ferrule made in accordance with the present invention;

Fig. 2 is an enlarged central longitudinal section view of the assembly shown in Fig. 1, partly in elevation, prior to the swaging process and showing an internal locking bushing;

Fig. 3 is similar to Fig. 2, showing the splicing ferrule after it has been swaged on the ends of the two ropes;

Fig. 4 is a section view taken on line 4—4 of Fig. 2;

Fig. 5 is a section view taken on line 5—5 of Fig. 3;

Fig. 6 is a section view taken on line 6—6 of Fig. 3;

Fig. 7 is a view similar to Fig. 2, showing a modification of the ferrule and the utilization of a plug instead of a bushing for use with a hemp core wire rope, and being illustrative of the condition prior to swaging of the ferrule;

Fig. 8 shows a condition of the assembly in Fig. 7, after the ferrule has been swaged down upon the two rope ends;

Fig. 9 is an exploded view showing the means for applying the plug to a hemp core wire rope;

Fig. 10 is a section view taken on line 10—10 of Fig. 8;

Fig. 11 is a section view taken on line 11—11 of Fig. 8;

Fig. 12 is a section view taken on line 12—12 of Fig. 8;

Fig. 13 is a perspective view of a looped terminal ferrule prior to attachment to the end of a wire rope;

Fig. 14 is an enlarged central longitudinal section view of the device of Fig. 13, showing the manner in which the ferrule portion thereof has been attached to the wire rope in accordance with the present invention;

Fig. 15 is a central longitudinal section view of a terminal socket fitting, illustrating another utilization of the present invention;

Fig. 16 is a section view taken on line 16—16 of Fig. 15;

Fig. 17 is a cross section view of the bushing shown in Fig. 16;

Fig. 18 is a cross section view of the terminal socket ferrule shown in Fig. 15;

Fig. 19 is an elevation of a looped wire rope to which is attached a hoop closing ferrule embodying the principles of the present invention;

Fig. 20 is a greatly enlarged central longitudinal section view of the loop closing ferrule shown in Fig. 19, with a portion of the wire rope shown in elevation;

Fig. 21 is a section view taken on line 21—21 of Fig. 20;

Fig. 22 is a section view taken on line 22—22 of Fig. 20; and

Fig. 23 is similar to Fig. 20, showing a modification of the ferrule which when swaged produces the chambered locking action of the present invention.

Referring now to the drawings in detail, and particularly to Figs. 1 through 6, there is illustrated therein the means according to the present invention of splicing the ends of a pair of wire ropes. The ropes 31 and 32 that are subject to the application of the apparatus and method of the present invention are usually built up of strands 33 made of wires 34 twisted together, the strands being twisted around a longitudinal wire rope core 35 also made of twisted wires 34. See Fig. 6.

The ends of ropes 31 and 32 are coupled by means of a ferrule 36 having a substantially cylindrical shape as shown in Figs. 1–3, and having an external surface 37 of substantially uniform diameter. The end portions of ferrule 36 have circular interiors 38 and 39 of substantially equivalent diameter which is somewhat smaller than the substantially uniform internal diameter of the circular central chambered portion 41. By virtue of the difference in diameter between chambered portion 41 and end portions 38 and 39, there are formed a pair of annular locking shoulders 42 and 43, respectively, within the interior of ferrule 36.

An elongated cylindrical bushing 45, made of a suitable material, such as brass, steel or other metal or alloy, is positioned substantially coaxially within the chambered portion 41 of ferrule 36. Bushing 45 is slightly shorter than said chambered portion 41 and has external terminal annular bevels 46 and 47 which are positioned opposite shoulders 42 and 43, respectively, of ferrule 36. As shown in Figs. 2 and 3, the major portion of bushing 45 has a substantially uniform cross section.

In order to produce the assembly shown in Fig. 2, the ends of strands 33 of rope 31 are first splayed out from core strand 35 by manual or mechanical means, after which the end of rope 31 is introduced into the left end of ferrule 36 approximately half way into the interior thereof. Next, bushing 45 is inserted through the right end of ferrule 36 and forced by suitable means for about half its length between strands 33 of rope 31, core strand 35 of rope 31 entering into the central aperture of bushing 45, which is adapted to accommodate said core strand. Thereafter, the splayed outer end of rope 32 is inserted through the right end of ferrule 36, the ends of strands 33 of rope 31 moving over the remaining half of bushing 45 while the end of core strand 35 of rope 32 moves into the central aperture of bushing 45. Bevels 46 and 47 of bushing 45 facilitate the spreading of strands 33 of both ropes 31 and 32 into the central chambered portion 41 of ferrule 36.

It will be noted in Fig. 2 that the diameters of end portions 38 and 39 of ferrule 36 are slightly larger than the diameters of ropes 31 and 32, respectively, while the diameter of chambered portion 41 of ferrule 36 is slightly larger than the overall diameter of the assembly of bushing 45 with strands 33 of ropes 31 and 32.

After ropes 31 and 32 are positioned end to end within ferrule 36, a pair of swaging dies or the like is applied by suitable pressure means to the exterior surface 37 of ferrule 36, and being made of a somewhat ductile metal, its internal diameter is reduced to the condition of applying a considerable pressure upon the assembly of ropes 31 and 32 and bushing 45.

When the swaging process is completed, as can be seen from the illustration of Fig. 3, the interior surface of ferrule 36 is in intimate gripping contact throughout its length with the peripheries of ropes 31 and 32. It will be observed that sloping annular shoulders 42 and 43 on the interior surface of ferrule 36 form an annular lock with the tapered bevels 46 and 47, respectively, of bushing 45, said lock resisting any outward longitudinal tension that may be applied to ropes 31 or 32, or both.

The material of ferrule 36 is selected so that, despite its slight ductility for swaging purposes, it is sufficiently strong to resist expansion of the diameter of end portions 38 and 39 when tension is applied to ropes 31 and 32, thereby preserving and ensuring the locking action of annular shoulders 42 and 43.

Fig. 4 is a representation of the assembly of rope strands and bushing within chamber 41 of ferrule 36 prior to the swaging operation. Fig. 5 illustrates the condition of the bushing and strands assembly within chamber 41 after ferrule 36 has been swaged to compress the strands 33 around bushing 45. Fig. 6 illustrates the manner in which strands 33 have been compressed around core strand 35 within the end portions of ferrule 36. The schematic representations of Figs. 4, 5 and 6 are intended to illustrate as accurately as possible within the limitations of draftsmanship the conditions obtaining within ferrule 36.

In some embodiments, tapered bevels 46 and 47 of bushing 45 may be dispensed with provided said bushing has a sufficient thickness to permit the sloping of strands 33 around the edges of said bushing when shoulders 42 and 43 perform their locking action.

Figs. 7 through 12 show modifications of the ferrule locking structure shown in Figs. 1 through 6. In Fig. 7, ferrule 51 has a central aperture 52 of uniform diameter while its external surface has annular bosses 53 and 54 at its respective ends, of greater diameter than that of its central portion. Assuming that ferrule 51 of Fig. 7 is substituted for ferrule 36 in Figs. 1 to 3, ropes 31 and 32 may be positioned therein in conjunction with bushing 45 after which swaging dies having a uniform internal diameter are urged against the exterior surfaces of ferrule 51. After the swaging operation has been performed, ferrule 51 has been altered in shape to the form shown in Fig. 8, whereby locking annular shoulders 55 and 56 are formed to cooperate with the tapered bevels 46 and 47, respectively, of bushing 45 (Fig. 2), to lock the rope in position, in a manner similar to that hereinabove in connection with ferrule 36.

In Figs. 7 through 12, however, an additional modification is provided in the form of a pair of solid rod-like plugs 57 and 58 made of a suitable metal or alloy and being adapted for use particularly with wire ropes having longitudinal cores of hemp. Where ropes 61 and 62, Figs. 7 through 12, are provided with a central core 63 of hemp, around which strands 64 of wire are coiled, it is impracticable to use a bushing 45 as described in connection with Figs. 1 through 3. With ropes 61 and 62, it is more suitable to utilize plugs 57 and 58 having longitudinal stems 65 and 66, respectively, of a diameter substantially equal to that of hemp core 63, heads 67 and 68, respectively, of somewhat larger diameter, and tapered shoulder sections 71 and 72, between the respec- In order to produce the assembly shown in Figs. 7 through 12, strands 64 of ropes 61 and 62 are splayed apart and the hemp core 63 is cut by suitable tool down to a point where either plug 57 or 58 may be inserted so that the ends of their stems 65 and 66, respectively, abut the cut ends of core 63 and the outer end of their heads are positioned substantially flush with the splayed out ends of strands 64 of ropes 61 and 62, respectively, as shown in Figs. 7 and 8. The major portions of heads 67 and 68 within the inner chamber of ferrule 51 have substantially uniform cross sections.

After plugs 57 and 58 are inserted into the respective ends of wire ropes 61 and 62, the rope ends, together with said plugs, are inserted through opposite ends of ferrule 51 until they meet at substantially the center thereof. Thereafter the swaging operation is performed on ferrule 51 to reduce the diameter of its interior surfaces to the point of producing a gripping action upon the exterior surfaces of ropes 61 and 62. Since the swaging dies have uniform diameters and produce a ferrule 51 (Fig. 8) having an exterior surface of uniform diameter, the flow of the substance of the ferrule in the areas of bosses 53 and 54 causes the formation of sloping annular shoulders 55 and 56 which form a lock with tapered sections 71 and 72, respectively, of coaxially positioned plugs 57 and 58, whereby the outer strands 64 of ropes 61 and 62 are locked into position and resist any longitudinal tension that may be applied to the ropes 61 and 62.

Figs. 10, 11 and 12 are similar to Figs. 4, 5 and 6, in that they are schematic cross section representations of various points of the ferrule, rope and plug assembly shown in Fig. 8.

It will be apparent that when ropes are provided with fittings in the form of either ferrule 36 (Fig. 2) or ferrule 51 (Fig. 7), the swaging process produces resulting ferrules as shown in Figs. 3 and 8, which are substantially similar in that each of them have a substantially uniform external diameter and an intermediate chambered interior section which accommodates the ends of the respective ropes whose strands have been splayed out either by a locking bushing or locking plug, the annular shoulder portion of the chamber in combination with a beveled or tapered portion of the bushing or plug forming a substantially circular lock upon the splayed out strands of the wire rope which has greatly increased resistance to longitudinal tension applied thereto.

It is also obvious that either plugs 57, 58 and bushing 45 may be interchangeable in conjunction with either ferrule 36 or ferrule 51. In some embodiments, the single bushing 45 may be replaced by two half bushings in much the same manner as the two plugs 57 and 58 are utilized in Figs. 7 and 8. Conversely, plugs 57 and 58 may be united into a single plug having the combined shape of both when joined at their heads, to form a unitary locking element.

Plugs 57, 58 may also be utilized with ropes having wire core strands providing suitable means are improvised to cut back the central core to accommodate such solid plugs which may have any suitable size or shape to perform their locking function.

While ferrule 36 (Figs. 1, 2 and 3) and ferrule 51 (Figs. 7 and 8) have been described hereinabove as performing the function of splicing the ends of a pair of wire ropes, it is evident that the principles of the present invention are equally applicable to ferrules employing the same internal locking arrangement for use as terminal fittings at the end of a single rope. Visualizing that ferrule 36 may be cut physically in cross section at line 4—4 of Fig. 2, and that ferrule 51 may be similarly cut on line 10—10 of Fig. 8, each of the two resulting half sections of ferrules 36 and 51, respectively, will serve as terminal fittings for the ends of wire ropes, and perform the locking function described hereinabove.

Terminal fittings for the ends of wire ropes, however, usually require a linkage element in order to secure or hitch the wire for use with the hook of a crane, the top of a tower, or other apparatus to which the rope is to be anchored. Such a terminal fitting 81 is illustrated in Figs. 13 and 14, and comprises a loop 82 to the legs of which is integrally connected a cylindrical ferrule 83 having a central longitudinal bore 84 divided into two sections 85 and 86, the latter having a somewhat larger diameter than the former. Intermediate sections 85 and 86 is an annular shoulder 87 whose form and function is equivalent to shoulders 42, 43 (Figs. 2, 3) and shoulders 55, 56 (Fig. 8).

As in the cases of the previous embodiments described hereinabove, a wire rope is inserted through the right end of bore 84 in ferrule 83, and its outer strands 89 are splayed apart from its central core 91 so that cylindrical bushing 92 may be inserted into the opposite end of bore 84 whereby its central aperture fits over core 91 and spaces outer strands 89 apart therefrom in a circular array in a manner similar to that disclosed and described in connection with Figs. 1 through 12. Bushing 92 has a tapered annular bevel 93 which, in combination with annular shoulder 87 of ferrule 83, performs a locking action upon strands 89 when ferrule 83 is swaged in a manner similar to that described hereinabove in connection with Figs. 3 and 8. The substance of ferrule 83 is sufficiently ductile so that the swaging operation causes reduction in both the external and internal diameters of ferrule 83, resulting in sections 85 and 86 producing a strong gripping action upon the rope and upon strands 89. Longitudinal tension imposed upon the rope to the right (Fig. 14) is resisted by the locking action produced by annular shoulder 87 in combination with the tapered annular bevel 93 of bushing 92. It is to be noted that the illustration in Fig. 14 shows the condition of the ferrule-rope assembly prior to the swaging operation which subsequently brings the interior surfaces of the ferrule into intimate gripping contact with the rope and its strands 89, comparable to the conditions shown in Figs. 3 and 8.

Also it is to be understood that when the rope is provided with a hemp core, comparable to that illustrated in connection with Figs. 7 through 12, bushing 92 may be replaced by a plug similar to plug 58 in Figs. 7 and 8. In either case, the locking function is provided by the sloping annular shoulder 87 which is positioned between the chambered portion 86 and narrow portion 85 of bore 84 in ferrule 83. In some embodiments, the terminal fitting of Fig. 13 may have a blind bore, longitudinal aperture 84 being closed at the loop end thereof. In such an embodiment the central bore will be of sufficient size to admit the assembly of the rope, bushing 92, and strands 89 through its open end at the right, after which the swaging operation described hereinabove is performed.

In the embodiments described hereinabove and illustrated in Figs. 2, 3; Figs. 7, 8 and Fig. 14, the respective sloping locking shoulders 42, 43; 55, 56, and 87, have been shown positioned at some distance from the ends of their respective ferrules. It is to be understood that said sloping locking shoulders may be positioned in any suitable region of said ferrules up to the ends thereof, provided that the cooperating internal bushings or plugs have corresponding lengths so that the ends of said bushings or plugs form the lock with the coacting shoulders. Also, in these embodiments it is understood that the tapered bevels 46 and 47 of bushing 45, and bevel 93 of bushing 92, may be reduced in length or entirely eliminated provided the walls of said bushings are sufficiently thick to produce a curvature in the external strands of the rope around the edges of the bushings so that a locking action will be achieved between those edges and the cooperating sloping shoulders on the internal peripheries of the respective ferrules.

Also, in the embodiments where plugs 57 and 58 are utilized, the tapered bevels 71, 72 thereof may be reduced in length or even eliminated; provided, however, the plugs have appropriate contours to cause the curving of the outer strands of the rope in such a manner that the sloping shoulders 55, 56 of ferrule 51 produce their locking actions in the manner described.

As for the sloping annular locking shoulders in the ferrules described herein, it is evident that said sloping angles may be varied to accommodate various types of ropes. In some instances, the angles of said annular shoulders, if necessary, may be as great as 90° from the internal surfaces of the respective ferrules in order to provide suitable strand locking action with the internal bushings or plugs.

In some instances, terminal fittings or sockets are made of forged or cast material that is not amenable to the swaging operation. Such a forged or cast cylindrical terminal socket 101, illustrated in central cross-section in Fig. 15, has a pair of legs 102 which may terminate in a loop, not shown, similar to loop 82 in Fig. 13. Socket 101 has a large diameter chambered section 104 and a smaller diameter section 105 between which is formed a sloping annular shoulder 106.

In this embodiment, the end of wire rope is inserted through the right end of bore 103 of socket 101 when said socket is empty, a sufficient length being pulled through to facilitate the subsequent operations. Next, the end of the rope is inserted through the right end of a cylindrical ferrule 107 (Fig. 18), whose central aperture has a small diameter section 108 and a larger diameter chambered section 109 between which a sloping annular shoulder 111 is positioned. The end strands of the rope are then splayed out from the central core in chambered section 109 and a cylindrical bushing 112 is inserted therebetween in a manner similar to that shown in Fig. 14, for example. Bushing 112 has a tapered annular bevel 113, which in cooperation with sloping shoulder 111 of ferrule 107 performs a locking action upon the strands of the rope when said ferrule is swaged as described in connection with the previous embodiments herein.

Thereafter, the rope is pulled outward to the right through bore 103 in socket 101, until ferrule 107 seats itself in the chambered portion 104 of said socket, the sloping shoulder 106 thereof cooperating with the annular bevel 114 of ferrule 107 to resist any longitudinal tension applied upon the rope secured therein, the complete assembly being illustrated in Figs. 15 and 16. Where a hemp core wire rope is utilized, bushing 112 may be replaced by a plug similar to plug 58 shown in Figs. 7–9.

Another form of the present invention is shown in Figs. 19 through 22 wherein the ferrule and bushing combination is utilized for forming and securing a loop 121 in wire rope 122. In this embodiment rope 122 is first passed through a cylindrical bushing 123 and then passed through a cylindrical ferrule 124, a sufficient length of rope 122 being drawn beyond ferrule 124 so that it may be doubled back to form loop 121. The ends of strands 125 of rope 122 are splayed out and inserted in a substantially circular array around rope 122 within ferrule 124 after which bushing 123 is forced into position between the outer surface of rope 122, and the splayed out strands 125, as shown in Fig. 20. Other means for assembling the rope, ferrule and bushing, as shown in Fig. 22, may be improvised. Thereafter, swaging dies are applied to the assembly to cause the somewhat ductile ferrule 124 to be reduced in diameter, thereby forming a central chambered portion 126 bounded at each end by sloping annular shoulders 127 and 128, respectively, which produce a locking action upon strands 125 in conjunction with tapered annular bevel 129 of bushing 123 and the opposite annular edge 131 of bushing 123, respectively.

The loop forming ferrule of Fig. 20 may alternatively be made in the form shown in Fig. 23, where the external surface of ferrule 135, before swaging, has an annular boss 136 which, when swaged, causes the formation of a sloping locking shoulder, similar to shoulder 127 in Fig. 20.

It is evident that the terminal and splicing fittings of the present invention may be applied to stranded ropes and cables made entirely of hemp, or other fibers or fabric in addition to the stranded wire rope described hereinabove.

In the specification, I have explained the principles of my invention, and the best mode in which I have contemplated applying those principles, so as to distinguish my invention from other inventions; and I have particularly pointed out and distinctly claimed the part, mode or combination which I claim as my invention or discovery.

While I have shown and described certain preferred embodiments of my invention, it will be understood that modifications and changes may be made without departing from the function and scope thereof, as will be clear to those skilled in the art.

I claim:

1. A fitting for a rope having a plurality of strands comprising an elongated element interposed substantially centrally amongst the strands of said rope whereby said strands are spaced around said element to form a section of said rope having a larger diameter than the adjacent portion of said rope, the greater portion of said element having a substantially uniform external diameter, at least one tapered annular bevel portion on said element adjacent said greater portion of said element, a cylindrical ferrule swaged around said larger diameter section and said adjacent portion of said rope, the internal surface of the ferrule after swaging bearing against said larger diameter section and said adjacent portion of said rope and forming an annular shoulder opposite said annular bevel portion of said element, said shoulder and said bevel portion forming an annular lock upon the strands of rope therebetween and securing said rope firmly within said ferrule.

2. A fitting for a rope according to claim 1 wherein said rope has a central longitudinal core and said element is in the form of a cylindrical bushing fitting around said core and spacing said strands apart therefrom to form said larger diameter section.

3. A fitting for a rope having a plurality of strands comprising an elongated element interposed substantially centrally amongst the strands of said rope whereby said strands are spaced around said element to form a section of said rope having a larger diameter than the adjacent portion of said rope, said element having a substantially uniform external diameter, a cylindrical ferrule having a greater longitudinal dimension than said element, said ferrule being swaged around said larger diameter section and said adjacent portion of said rope, the internal surface of the ferrule after swaging bearing against said larger diameter section and said adjacent portion of said rope and forming an annular shoulder therein between said larger diameter section and said adjacent portion of said rope opposite the end of said element, said shoulder and said end of said element forming an annular lock upon the strands therebetween and securing said rope firmly within said ferrule.

4. A fitting for splicing two ends of wire rope each having a plurality of strands, said ends being abutted longitudinally of each other, comprising an elongated element interposed substantially centrally amongst the strands of the end portions of both of said ropes whereby the strands of each of said ropes are spaced around said element to form larger diameter sections thereof than the adjacent respective portions of said ropes, said element having a substantially uniform external diameter, a cylindrical ferrule having a greater longitudinal dimension than said element and extending over both abutted end portions of said ropes, said ferrule being swaged around both said larger diameter sections and both said adjacent portions of said ropes, the internal surface of the ferrule after swaging bearing against both said larger diameter sections and both said adjacent portions of said ropes and forming annular shoulders therein between said larger diameter sections and their respective adjacent portions of said ropes opposite the respective ends of said element, said shoulders and the respective ends of said elements forming respective annular locks upon the strands therebetween and securing said ropes firmly within said ferrule.

5. A fitting for a rope having a plurality of strands comprising an elongated element interposed susbtantially centrally amongst the strands of said rope whereby said strands are spaced around said element to form a section of said rope having a larger diameter than the adjacent portion of said rope, said strands sloping between said larger diameter section and said adjacent portion of said rope in an annular array only around the end portion of said element, at least the greater portion of said element having a substantially uniform external diameter, a cylindrical ferrule having a greater longitudinal dimension than said element, said ferrule being swaged around said larger diameter section and said adjacent portion of said rope, the internal surface of the ferrule after swaging bearing against said larger diameter section and said adjacent portion of said rope and forming an annular shoulder therein between said larger diameter section and said adjacent portion of said rope opposite the end of said element, said shoulder and said end of said element forming an annular lock upon those portions of said strands sloping therebetween and securing said rope firmly within said ferrule.

6. A fitting for a rope having a plurality of strands, comprising an elongated element interposed amongst the strands of a portion of said rope whereby said strands are spaced apart to form a section of rope having a somewhat larger diameter than that of the adjacent portion of said rope, the greater portion of said element having a substantially uniform external diameter, a cylindrical ferrule swaged around said section and said adjacent portion of said rope, the interior of said ferrule in the area between said section and said adjacent portion forming an annular shoulder, said shoulder cooperating with the end of said element to lock the strands of said rope securely therebetween.

References Cited in the file of this patent

UNITED STATES PATENTS

| | | |
|---|---|---|
| 650,860 | McTighe | June 5, 1900 |
| 1,258,304 | Bishop | Mar. 5, 1918 |
| 1,855,340 | Damon | Apr. 26, 1932 |
| 1,886,247 | Cole | Nov. 1, 1932 |
| 1,909,332 | Blackburn | May 16, 1933 |
| 1,910,269 | Sunderland | May 23, 1933 |
| 1,927,382 | Andrew | Sept. 19, 1933 |
| 2,093,403 | Sertillange | Sept. 21, 1937 |
| 2,237,618 | Weatherford | Apr. 8, 1941 |
| 2,252,448 | Van Nest | Aug. 12, 1941 |
| 2,708,131 | Snow | May 10, 1955 |

FOREIGN PATENTS

| | | |
|---|---|---|
| 608,014 | Great Britain | Sept. 8, 1948 |
| 103,751 | Switzerland | Mar. 17, 1924 |